April 12, 1927.

A. T. NABSTEDT 1,624,756

REVERSING GEAR

Filed June 21, 1919

Inventor:
Arthur T. Nabstedt
by Henry T. Prickett
his attorney.

April 12, 1927.

A. T. NABSTEDT 1,624,756

REVERSING GEAR

Filed June 21, 1919

Inventor:
Arthur T. Nabstedt,
by Henry E. Rockwell
his Attorney

Patented Apr. 12, 1927.

1,624,756

UNITED STATES PATENT OFFICE.

ARTHUR T. NABSTEDT, OF NEW HAVEN, CONNECTICUT.

REVERSING GEAR.

Application filed June 21, 1919. Serial No. 305,884.

This invention relates to reversing gear and although, in its broad aspects, it is applicable to gearing or transmission mechanism employed for various purposes, it pertains more especially to a reversing gear for use in connection with marine engines. When so employed, my new mechanism is adapted to drive the propeller shaft from the engine shaft either directly or in a reverse direction, as may be desired, in an efficient manner. The mechanism is controlled by a lever or the like movable to any of three positions, which correspond respectively to the direct drive of the propeller shaft, the reverse drive, and the idle or neutral condition of said shaft. In the broader phases of the invention, however, the particular character of the driving and driven members with which the improved mechanism is associated, is immaterial.

One of the primary objects of the invention is to furnish an improved, superior arrangement of gearing for obtaining a reverse drive. In this connection, it may be stated that one of the main advantages of my gearing consists in its great strength, sturdiness and ruggedness, and its ability to transmit the maximum power of the motor to the driven shaft on the reverse as well as on the forward drive.

Another advantage of prime importance arises from the fact that in the design of gearing embodying the invention, a wide range of reverse speed ratio is possible so that the most desirable ratio for a given set of conditions may be selected. For example, it has been shown by experience that for heavy duty, slow moving motors and boats, a ratio of from eighty to ninety percent of the reverse rotation to the forward rotation is highly desirable; and it is one of the many advantages of the present invention that such a ratio can be readily obtained, if desired, although it is a further advantage that such considerable changes of speed ratio are readily obtainable, without departure from the principles of the invention, as to adapt the gearing to many and various conditions.

Other objects which I have in view are the efficient transmission of power from gear to gear and through the whole gearset; the reduction of fibre stresses in the gears and pinions; the provision of bearing surfaces of ample size for the pinions employed, with incidental decrease of bearing stress; a very considerable improvement in ease and thoroughness of lubrication; convenience of assembly and disassembly; increased rigidity of construction; and increased simplicity and compactness of the controlling mechanism.

The invention also purposes the provision of certain features of improvement whereby the mechanism is particularly well adapted for use in connection with marine motors. In this connection one of the important advantages consists in an arrangement of parts whereby side thrust is eliminated or substantially reduced in a reversing mechanism of the particular class indicated, and additional improvements in construction and operation will more clearly appear hereinafter or will be obvious to those skilled in the art.

To these and other ends, the invention consists in the novel features and combinations of parts to be hereinafter described and claimed.

The reverse gear selected for illustration comprises a driving internal gear, a pinion cage or carrier having one or more pinions engaging the teeth of said internal gear, said cage or carrier being likewise provided with another pinion or pinions meshing with the first pinion or pinions and with a second internal gear. Provision is made for holding the cage fixed or stationary for obtaining a reverse drive of the driven part to which the driven internal gear is connected. When it is no longer desired to drive the driven part in the reverse direction, the cage or carrier is released, whereupon the driven internal gear is free to remain stationary while the driving internal gear and the cage are rotated from the motor or the like. For producing a direct drive of the driven shaft or member from the driving shaft or member, provision is made for coupling together certain driving and driven members respectively. In the form shown, the gearing is enclosed in a suitable housing rotatable with the cage, and in obtaining the reverse drive the housing is locked against rotation in a convenient manner. For securing forward drive, in the particular case illustrated, a driving member and a driven member are both locked frictionally to the housing, but this particular method of obtaining forward drive is not material in those broad aspects of the invention which are particularly concerned with the novel arrangement and operation of the gear members.

The drawing illustrates a gearset of the marine type wherein the housing A is disposed over the forward end of the propeller shaft B. The engine shaft (not shown) is locked in a sleeve C adjacent the front end of the housing. The sleeve C is provided with a socket D for the reception of the engine shaft, which may be locked in said sleeve by a key (not shown) engaging a keyway E in the sleeve. The arrangement is such that the rear end of the engine shaft in the socket D may and preferably does extend into approximate contact with the forward extremity of the driven shaft B. Associated with the housing A at the rear extremity thereof is a brake mechanism F (in this instance illustrated as a cone brake) for holding the housing and its associated pinion cage stationary on the reverse drive. In the particular example shown, forward drive is obtained by frictionally locking one of the driving members to the housing by a friction clutch G within the forward end of the housing, and by locking one of the driven members to the housing through a friction clutch H within the rear end portion of the housing. All of the locking mechanisms or brake F and clutches G, H, are controlled from a controlling rock shaft I, to which the controlling lever J (partially shown in Fig. 2) is rigidly connected. The rock shaft I is preferably disposed above the driven shaft somewhat to the rear of the housing A and directed transversely to the driven shaft. The control is effected by the longitudinal movement of a sleeve member K freely slidable longitudinally on the driven shaft, but secured to rotate with the housing.

Referring now to the details of the mechanism, it will be seen that the engine sleeve C is provided with a lateral flange 10 bolted by bolts 11 to a plate or disk 12, on which the forward end portion of the housing A has a bearing. The housing, as shown, consists of two main parts, viz, a comparatively small ring-like forward end section 13, and a comparatively large cup-shaped rear section 14. The forward end portion of section 13 has a bearing on the periphery of the plate 12 providing for relative rotation of the parts, but a strip of packing 15 is interposed between said parts to prevent the escape of lubricant. The rear section 14 of the housing embraces and is adapted to rotate relatively to a sleeve 16 keyed to the driven shaft B and located within the rear end portion of the housing. The keys for locking the sleeve to the shaft are shown at 17. A suitable bushing 18 is interposed between a portion of the sleeve 16 and the edge of the opening in the housing section 14.

Figure 3:
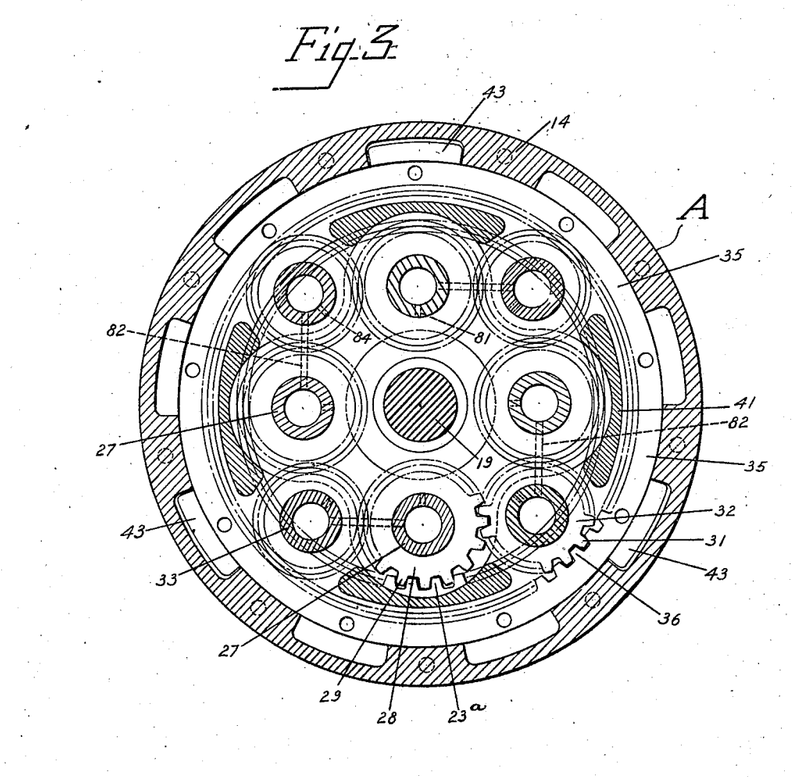
Fig. 3 is a section on line 3—3 of Fig. 1, looking in the direction of the arrows. In this view, the pinion teeth and the teeth of the driven internal gear are only partially shown.

The driven sleeve 16 is secured to the driven shaft at a point where the same is of a full diameter, but immediately in front of that portion on which the sleeve is mounted the driven shaft is reduced to form an extension 19 of less diameter. At the forward end of the extension 19 is a bearing sleeve 20 of considerable length secured to the plate 12 by screws 21 so as to rotate with the engine sleeve. This sleeve 20 serves as a substantial bearing for the forward extremity of the driven shaft which, as stated, is in close proximity to the rear end of the engine shaft. Intermediate the driven sleeve 16 and the plate 12 is a pinion cage or carrier, which serves as a mounting for one or more pinions adapted to be driven from the driving shaft by means of a ring-like gear member or internal gear 22 having teeth 23$^a$ cut on its inner periphery as partially shown in Fig. 3. As shown, the internal gear 22 approximates in diameter the driving plate or disk 12 and it is secured to the peripheral portion of said plate or disk within the housing by means of the bots or screws 11, previously mentioned, which pass through openings in the engine sleeve flange and plate 12 into threaded sockets in the gear 22. The pinion cage or carrier has a front plate or head 23, a rear plate or head 24, and an intermediate member or plate 34. The plate 23 is adapted to rotate freely on the bearing sleeve 20 within a recess 25 at the inner face of plate 12. The rear plate 24 of the cage or carrier is adapted to rotate freely on the rear portion of the driven shaft extension 19, for which purpose a suitable bushing 26 is fitted in the central opening in the rear plate 24 around the driven shaft. The pinion cage plates or heads provide support for long pinion studs 27 on which are rotatably mounted pinions 28 having teeth which engage the teeth of the internal driving gear 22. The pinions 28 are quite long and their forward ends are provided with teeth 29 which mesh with those of the internal gear; while at their rear end portions, said pinions 28 are provided with additional teeth 30 engaging the teeth 31 of short pinions 32 likewise carried by the pinion cage. The pinions 32, which may be referred to as the driven pinions as distinguished from the driving pinions 28, are mounted to rotate on short studs or bearing pins 33, extending between the rear head 24 of the cage and the intermediate plate or ring 34. Preferably the heads of the cage and the intermediate plate 34 are formed as one casting. As shown in Fig. 3, each of the pinions 28 engaging the driving internal gear has located at the respective sides of said pinion, the short pinions 32, which are so placed as to engage and drive a second or driven internal gear 35. The internal gear 35 is provided on its interior periphery with teeth 36, that are engaged by the teeth 31 of the short pinions. As shown in Fig. 3, the rear teeth 30 of each long driving pinion engage the teeth 31 of two of the short pinions located at opposite sides thereof respectively; and each of the short pinions 32 in addition to being engaged with the internal driven gear 35 is engaged at opposite sides respectively with the teeth of two of the driving pinions, between which it is interposed. The driven internal gear 35 is suitably secured to the member to be driven, which in this instance is the shaft B, and in the particular form illustrated it is non-rotatively secured to the driven sleeve 16 by means of an intermediate ring or annulus 37. The gear 35 is located at about the middle part of the housing, within the latter and in close proximity to the interior periphery thereof, and is rigidly secured to the forward face of the ring 37 by screws 38 or the like. At its inner periphery the ring 37 is provided with teeth 39, which are fitted within notches 40 on the outer periphery on the driven sleeve 16. In this manner, the driven internal gear is non-rotatively secured to the driven shaft, but the particular means for effecting this purpose may be considerably varied, and the connection may be more or less direct, as required by conditions. The rear head 24 of the pinion cage, which is of less diameter than the gear 35 and the ring 37, is located in front of and in close proximity to a portion of said ring 37. The cage is non-rotatably secured to the housing by radial lugs 43 at the periphery of the intermediate plate 34, engaging long longitudinal grooves 44 in the rear section or cover plate 14 of the housing. A plurality of grooves 44 are cut lengthwise in the inner periphery cover plate so as to receive the lugs of the pinion carrier and thereby lock said carrier and the housing against independent rotation. As has has been previously stated, the heads of the cage and the intermediate plate 34 thereof are preferably, although not necessarily, formed as a single casting and in the present instance they are so shown, the connecting means between the intermediate plate and the rear head being in the form of curved lugs or posts 41, and the connecting means between the front head and said intermediate plate being constituted by posts 42.

Figure 2:
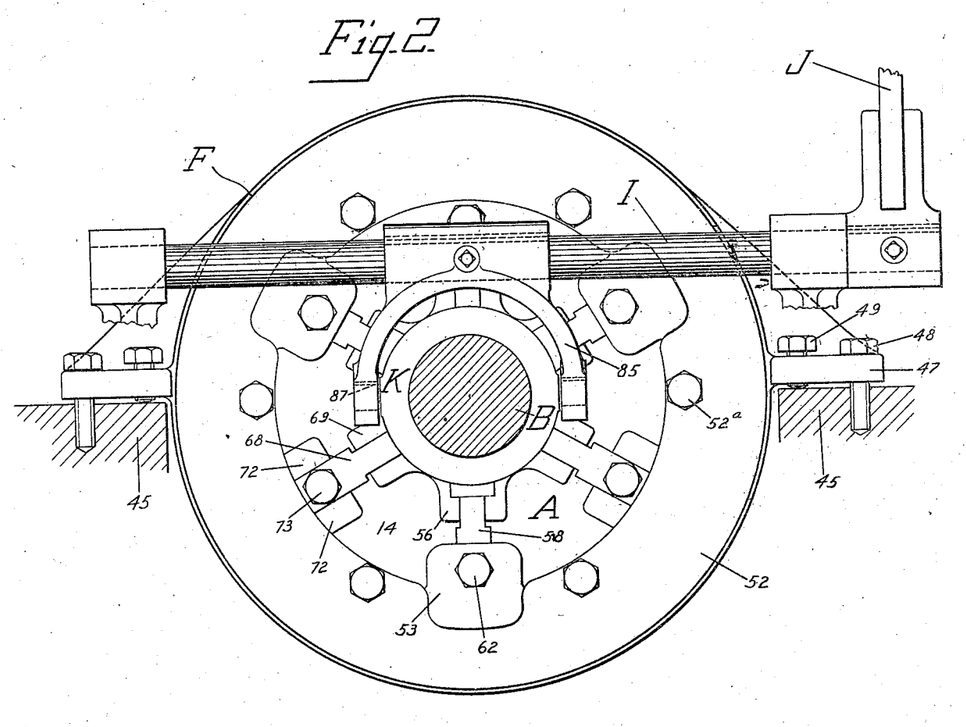
Fig. 2 is an end elevation partly in section, looking from the right of Fig. 1, with the controlling lever and other parts broken away.

The brake mechanism F, previously mentioned, is adapted to lock the housing to a stationary part, such as the engine bed or frame, having longitudinal members 45 (Fig. 2). In the particular form shown, the brake consists essentially of a ringlike stationary member 46 supported on the bed by lugs 47 and suitable securing devices associated therewith, such as screws 48 and 49. The brake ring 46 is located rearwardly beyond the main portion of the housing, but cooperates with a rearward extension on the housing, having associated therewith a brake member 50 to cooperate with the member 46. At the rear end of the cover section 14 of the housing, said section is provided with an annular rearwardly projecting collar or sleeve 51, on the exterior surface of which the brake member 50 is arranged to slide in an axial direction. In the form shown, the stationary member 46 serves as the outer member of a cone brake, and the member 50 associated with the housing constitutes the inner movable member of said brake, the members 46 and 50 being provided with cooperating conical friction surfaces, as shown. At its rear end, the sleeve or collar 51 on the housing has secured thereto by bolts 52$^a$, a stop flange 52 adapted to cooperate with the brake member 46 in the manner to be presently described. Rotation of the sliding brake member 50 on the collar 51 is prevented by extending inwardly from the rear edge of member 50 lugs 53 which pass through openings 54, and have their oposite side edges in close proximity to the side edges of the corresponding openings 54, whereby relative rotation of the parts 50 and 51 is prevented, although the member 50 has a limited axial sliding movement on member 51. This sliding movement is controlled to a certain extent by means such as springs 55 interposed between the rear part of member 50 and the stop flange 52. In the neutral or idle position of the gearing, the springs 55 hold the brake member 50 away from the front face of the stop flange 52 and out of contact with the stationary brake member 46.

The brake mechanism just described is controlled from the sliding sleeve K on the driven shaft in a suitable manner. In the embodiment illustrated, the forward end of sleeve K is provided with a series of projecting lugs 56 having pivotal connection at 57 with the inner ends of cam levers 58 pivoted to the housing at points within the collar or sleeve 51. In the form shown, each of the cam levers is pivoted intermediate of its end by means of a pivot 59 between lugs 60 projecting inwardly, in parallel relation, from the collar or sleeve 51. In the form shown, there are three of the lugs 56 on the sleeve K, operatively connected with three cam levers 58, which are pivotally mounted between three pairs of lugs 60. Each of the cam levers 58 is provided at its outer rear part with a cam portion 61 adapted to engage the inner end of a contact screw 62 engaging a threaded socket in one of the inwardly projecting lugs 53 of brake memzer 50; and the arrangement is such that as the controlling sleeve K is thrown forwardly by a rearward movement of the main controlling lever J, the cam portions 61 of the cam levers 58 will engage the corresponding contact screws 62 in such a manner as to have a tendency to thrust the brake member 50 rearwardly relatively to the housing and into contact with the stationary brake member 46.

The cluch mechanism H, previously mentioned, which serves the purpose of locking the housing to the driven member on the forward drive, may be constructed as follows: At the rear of the ring 37, within the housing, is a clutch plate 63 having teeth or projections 64 on its outer periphery engaging the grooves 44 of the housing. The inner surface of the clutch plate 63 is plain and clears the driven sleeve 16. A somewhat similar but thicker friction plate or ring 65 is also located in the rear portion of the housing. The plate 65 is locked to the housing in the same manner as the plate 63. Interposed between the plates 63 and 65 is a friction plate 66 non-rotatably secured to the driven sleeve. The inner periphery of the plate 66 is provided with teeth or projections which engage the notches 40 of the driven sleeve so as to lock said parts together in a manner similar to that in which the ring 37 is interlocked with the sleeve. In the rear end wall of the housing a plurality of plungers 67 are mounted, which are adapted to move inwardly and outwardly so as to control the engagement and disengagement of the friction plates. In the present instance, three plungers 67 are provided, and they are operated by three operating levers 68. These operating levers 68 are actuated from the controlling sleeve K in the same general manner in which the operating levers 58 of the brake mechanism F are operated, for which purpose said sleeve K is provided with a series of lugs 69 similar to lugs 56, to which the levers 68 are pivoted by pins or trunnions 70. The levers 68 are provided with intermediate trunnions 71 mounted in lugs 72 of the housing similar to the lugs 60. An adjustable contact screw 73 extending through the outer part or head of each lever 68 is adapted to engage, by means of a rounded extremity provided thereon, the rounded outer surface of the corresponding plunger 67. It will be observed that as the lever J is thrown forwardly for the forward drive, the sleeve K in being pulled rearwardly causes the plungers 67 to be displaced relatively to the housing so as to engage the friction plates 63 and 65 with the intermediate friction plate 66 and thereby lock the housing to the driven sleeve 16.

In the form shown, the clutch G for engaging the forward end portion of the housing with one of the driving members, for forward drive, consists of a simple form of cone clutch by means of which the driving internal gear is frictionally engaged with the inner periphery of the housing. For this purpose, the inner periphery of the housing section 13 is provided with a conical friction surface $13^a$, and the outer surface of the gear 22 is provided with a cooperating conical friction surface $22^a$. When the housing is moved axially relatively to the gear 22 in one direction (which occurs in actuating the clutch H, as hereinafter more particularly described) the surface $13^a$ is brought into tight frictional engagement with the surface $22^a$; and when the housing is moved in the opposite direction (by operation of the clutch mechanism F, as hereinafter more particularly described) the cooperating friction surfaces of the clutch G are positively moved out of engagement with each other.

The pinions 28 and 32 have large bearings on the studs 27, 33, respectively, and said bearings are lubricated by supplying oil or other lubricant to the interior of the studs, which are made hollow for that purpose, so as to form oil pockets or reservoirs, which are in communication with the bearing surfaces through small ducts. Each of the long pinion studs 27 is hollowed out to present a longitudinally extending pocket 74 of substantial size, having an inlet or mouth 76 located at that end of the stud which is disposed toward the engine. At the opposite end of the stud the pocket is closed, but provided with a lateral passage communicating with one of the short pinion studs, as hereinafter described. Oil is supplied to the gearing through oil holes 77 in the engine sleeve, which communicate with an annular oil groove 78 at the inner face of the engine sleeve flange. A circular series of oil ducts 79 in the plate 12 is arranged so that said ducts register with the groove 78 and with a similar groove 80 at the inner face of plate 12. The groove 80 in turn is aligned with the inlet mouths 76 of the pockets 74 in the long pinion studs. It will be obvious, therefore, that oil or other lubricant fed into the oil holes 77 will flow into the pockets or reservoirs 74 regardless of the relative rotation of the engine sleeve and plate 12, on the one hand, and the pinion cage, on the other hand. From the pocket or reservoir 74, some of the oil passes to the bearing of the corresponding long pinion 28 through small radial ducts 81. These ducts are arranged in a longitudinal series in such a manner that the oil thrown out of the same in a radial direction will lubricate the long pinion bearing effectively throughout its length. A portion of the oil in each pocket 74 is also supplied to one of the adjacent short pinion studs 33 by means of a laterally disposed connecting tube 82. Each of the short pinion studs 33 is provided with an oil pocket 83 similar to the pocket 74 and a connecting tube 82 extending laterally from the rear end portion of each long stud feeds oil into the rear portion of an adjacent hollow short pinion stud. From each of the pockets 83 oil is supplied to the corresponding short pinion bearing by ducts 84 similar to the ducts 81. As will be observed from Fig. 3, all of the long pinion studs, which can be supplied with lubricant from the front end of the mechanism, as described, are utilized in supplying lubricant to the short pinion studs, with which they correspond in number, each long stud being connected to a corresponding short stud by one of the supply tubes 82, which supply tubes in this view are shown in dotted lines.

The controlling sleeve K is slid along the driven shaft by operation of the rock shaft I, for which purpose a yoke 85 straddling the sleeve K is keyed to said shaft. The respective ends of the yoke 85 are provided with forked or bifurcated portions 86, which fit over pins 87 on a collar 88 embracing the sleeve within a suitable groove with which the sleeve is provided, in such a manner that the sleeve can rotate freely within the collar, although it cannot move lengthwise with respect to the same. The collar is preferably made in two parts which are secured together by fastening screws 89.

Figure 1:
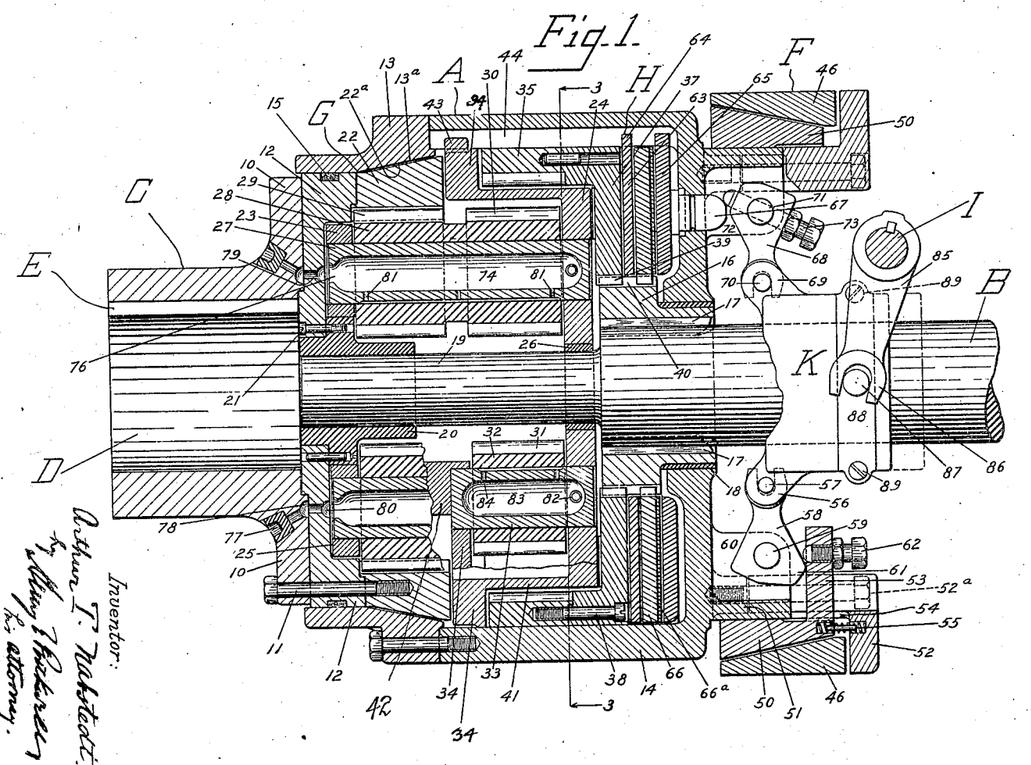
Fig. 1 is a vertical longitudinal section of a reverse gear embodying my invention, with certain parts omitted, and others shown in elevation. In this view, the gear is in the neutral position.

The operation of the mechanism is substantially as follows:

In the neutral position shown in Fig. 1, the operating lever J is preferably substantially vertical. The brake F and the clutches G, H are disengaged. The driving internal gear 22 is rotated constantly by the engine, and in being so rotated, the long pinions 28 are turned about their axes and are also turned bodily in a circular path or orbit, driving the short pinions, which also rotate about their axes and move bodily. The short pinions travel around freely on the internal gear 35, which remains stationary.

The forward drive or direct transmission is obtained by throwing the lever J in a forward direction, thereby pulling the controlling sleeve K in a rearward direction. As the sleeve K moves rearwardly, the series of cam levers or toggles 68 is actuated for the purpose of engaging the clutches H and G. As the cam levers 68 are jammed against the plungers 67, the friction disk or plate 65, which is preferably made of cast iron and serves as a pusher, is thrust against the disk or plate 66, which is preferably provided at its rear face with a bronze friction surface 66$^a$; and the plate or disk 66 is in turn forced against the friction disk or plate 63, (preferably made wholly of bronze), which is thereby moved into tight frictional contact with the ring or driving disk 37. The three friction disks or plates 63, 65, 66 and the ring 37 are, in this operation, pressed against the head 24 of the pinion cage, and in this manner all of the play between the plungers 67 and the plate 12 at the other end of the housing is taken up. When, therefore, the pressure on the plungers 67 is increased and they can move no farther in a forward direction due to the fact that all of the play in the friction members has been taken up, the reaction causes the cam levers 68 to pull the whole housing in a rearward direction, the effect of which is to bring into clutching engagement the surfaces 13$^a$, 22$^a$ of the clutch G. It will, therefore, be understood that by a single operation of the operating lever, that is, by thrusting it forward to a certain extent, both of the clutches H and G are engaged. The engagement of these clutches causes the direct drive, the driven shaft B being directly driven from the driving shaft through the housing. In the example illustrated, the housing is locked to the engine shaft through the intermediary of the internal gear 22, driving plate 12 and engine sleeve C. At its rear end the housing is interlocked with the driven shaft through the driven sleeve 16, and the friction plates or disks 63, 65, 66 and 37. The arrangement of the clutches, as shown, whereby the housing is locked to both the driving and driven members, provides a double drive, and one of the advantages of the clutch arrangement illustrated is that inasmuch as the disk clutch H is brought into play before the cone clutch G fully takes hold, the clutch can be readily eased in without shock or jarring. On the other hand, the cone clutch G has great strength. By providing two types of clutches in the combination shown, the structure is given smoothness as well as strength. On the forward drive all of the driving strain is put on the housing and none of it on the gearing. The interlocking of the gear teeth is not depended upon to transmit the drive, and all strain upon the gearing and its bearings, due to backlash and propeller vibration, is eliminated.

For the reverse drive, the operating lever J is pulled backward (through the neutral) so as to force the controlling sleeve K forward and thereby actuate the second set of cam levers (58) to engage the brake F. In this operation the cam levers 58 are forced against the lugs 53 carrying the contact screws 62. The resulting pressure causes the brake member 50 carrying said lugs 53 to be moved rearwardly in opposition to the springs 55, until a sufficient pressure has been created to cause the whole housing to slide forwardly. This forward movement is limited by the stop flange 52 carried by the housing, which stop flange comes into contact with the rear surface of the stationary conical brake member 46. Further pressure exerted through the levers 58 then causes the brake members 50 and 46 to be tightly engaged with each other. The clutching together of these two members holds the housing against rotation owing to the fact that the brake member 50 is non-rotatably secured to the housing. The pinion cage or carrier is likewise held stationary, inasmuch as it is locked to the housing by the lugs 43 engaging the housing grooves 44, as previously described. With the pinion cage held against rotation in this manner, and the pinion studs stationary, the long and short pinions can only rotate upon their axes as a result of the continuous rotation of the driving internal gear, and this rotation of the pinions causes the internal gear 35 to be rotated in a direction opposite to the direction of the driving internal gear. By this means, the propeller shaft B is driven in the reverse direction at a speed dependant upon the ratio of the gears and pinions.

In reversing mechanisms of the general class to which my invention relates, the power is measured by the power to reverse, and the latter depends upon two factors, namely, the power of the gearing to transmit power, and the ability of the locking mechanism or clutch to hold the drum or housing of the gear against rotation. My improved mechanism is very powerful, because the gearing is of great strength and because the means employed for holding the housing stationary is also very strong and effective.

First, concerning the gearing, which I regard as the most important feature of my invention, it is a well known fact that the internal gear type is the strongest type of gearing. By the use of an internal gear 22 at the engine end and a second internal gear 35 at the propeller end, all central gears are eliminated, which is very desirable, for various reasons. For example, a great deal more space is obtainable for the pinions, which can, therefore, be made very large and strong. The improved construction also permits such a wide range of reverse speed ratio that the most desirable ratio may be selected. For heavy duty, slow moving motors and boats, a ratio of from eighty to ninety per-cent of reverse to forward rotation is very desirable, and it may be readily obtained with my improved construction of the gearing.

Many reversing gears on the market are provided with pinions which are too small to give good results. This is due to the fact that in these designs, the size of the pinions is limited by the space available. Owing to the fact that central gears are employed, there is not sufficient space for pinions of proper size.

The strength of the internal gear lies in the fact that it places more than one tooth in contact at the same time, and its contact is a rubbing contact and not a striking contact, as in the case of external spur gear contact. This not only increases the strength of the internal gear, but also of the pinions with which it is in mesh. The fact that the internal gear drives on two pinion teeth at the same time obviously means that twice the strain can be taken on each pinion which could be taken if the drive were through only one tooth, and, therefore, the unit fibre stress in the pinions is smaller. It is true that the long and short pinions in my gearing have spur gear contact with each other, but in order that the advantage of double tooth contact may be carried throughout the train of gearing so as to give it maximum strength, a special design has been adopted. In this design what may be termed a three point contact system is employed, that is, each pinion instead of having a single pinion contact working against one internal gear contact is arranged to have two pinion contacts working against one internal gear contact. The two pinion contacts of each pinion, therefore, balance substantially the single internal gear contact of said pinion, so that the transmission of power from pinion to pinion is substantially as effective as it is from pinion to internal gear or vice versa. It will be noted that in the form shown in Figs. 1–3, where there are four long driving pinions and four short driven pinions, there are four contacts between the pinions and each internal gear, while on the other hand, there are eight contacts between pinions and pinions. In this manner, the gearing as a whole is very strong, owing to the reduction of fibre stress in the pinions, in addition to the use of internal gearing.

As regards the brake mechanism F, it should be noted that this mechanism, as herein illustrated, has the very important advantage of eliminating side thrust, or at any rate of reducing it to a minimum. When the two conical brake members 50 and 46 are engaged with each other, one serves as a centering means for the other, and as a result there is no appreciable side thrust such as would be caused by a constricting brake band of the type commonly employed. The holding power of a conical brake is also very much greater than that of a constricting brake band. It is to be clearly understood, however, that in the broader aspects of the invention, the particular means employed for holding the housing or its equivalent stationary is not material.

The particular brake mechanism herein shown for effecting reverse drive has other advantages in addition to that previously noted, inasmuch as all exterior lever and clamping parts are eliminated. On the reverse, all of the clutching or clamping is done within the cone member 46, which serves as a covering, and as a protection to the operator against contact with the moving parts.

In my improved mechanism there is also a further highly desirable feature, viz, the positive release of all clutching members in shifting from forward drive to reverse and vice versa. In this connection, it will be observed that as the controlling sleeve K is moved backward on the forward drive, the levers 68 pressing against the plungers 67 gradually impose more and more pressure between the plungers and the housing, thus drawing the entire housing backward. It is evident that, as the cone brake member 46 is bolted in a fixed position to the bed, the cone ring 50 is forced farther and farther away from said member by the springs 55, which are freed for operation by the movement of the cam levers 58, which takes place at that time. In other words, while the levers 68 are being operated to engage the clutches G, H, the levers 58 are being positively moved in such a direction as to release the springs 55 to a greater and greater extent. In this operation, the stop flange 52 is automatically and positively moved out of operation, as it is a part of the housing and moves rearwardly therewith. In order to interlock the members 46, 50, the engagement of the stop flange with member 46 is essential and on the forward drive this stop flange is carried by the casing in a rearward direction away from member 46 into an inoperative position. On the other hand, in shifting from forward drive to reverse, the cam levers 58 when thrown into operation put pressure upon the housing and cause the entire housing to be forced forwardly towards the engine. In this operation the plungers 67 slide outwardly thereby releasing clutch H, and at the same time, the clutching surface 13ª, 22ª, of clutch G are positively moved out of engagement by the movement of the housing. This positive release in both directions is highly important.

It has been previously intimated that by eliminating all central gearing the pinions can be made very large. From this it follows that the pinion bearings can also be made large so as to reduce the bearing stresses. Another important advantage consists in the ease and thoroughness with which the gearing can be lubricated. In gearing of this general character, the parts nearest the periphery are the most easily lubricated, owing to the action of centrifugal force. Therefore, internal gears, such as employed in my mechanism, are ideal so far as lubrication is concerned. By the same token, central gearing is the most difficult to lubricate, and consequently the elimination of central gearing is of importance from this standpoint also. The pinion teeth of my mechanism take up lubricant from the internal gears with which they mesh. The pinion bearings are thoroughly and efficiently lubricated by the arrangement previously described. The inside of the housing is provided with large pockets which hold a considerable quantity of oil. On the forward drive this oil, being thrown to the periphery by centrifugal force, is trapped by the engagement of the cone clutch G, so that no leakage can take place. On the reverse drive, the arresting of the housing causes a flood of oil to be thrown inward over the central members (where it is then needed) owing to the cessation of the centrifugal action. A still further advantage of the gearing arrangement, shown and described, consists in the fact that a large central bearing for the propeller shaft extension can be provided in the sleeve 20, which is very desirable. The two central bearings, i. e., that of the propeller shaft extension in the sleeve 20, and that of the rear housing section on the driven sleeve 16, are thoroughly lubricated by contact with other lubricated parts and by the throwing inward of an oil douche as a result of the arrest of the housing in reversing. The load on these bearings is, however, unusually light, owing to the fact that the clutches, and more especially the conical brake F, reduce side thrust, buckling and distorting pressures to a minimum.

It will be seen, therefore, that by my invention, in addition to the advantage of greatly increased strength and power, the mechanism is thoroughly and effectively lubricated, owing to the utilization to the utmost of centrifugal force, the employment of internal gears, and the elimination of central gearing. The oil carrying capacity of the periphery is multiplied, and the pinion bearings, which are the most difficult parts to lubricate, are thoroughly lubricated by the provision of the large interior oil reservoirs into which the oil is directly introduced.

The particular disposition of the pinion contacts, as herein described, is not only of advantage in connection with the elimination of fibre stresses in the pinions, but also by reason of the fact that the pressures on the pinion bearings are balanced and well distributed.

The parts can be very readily assembled and disassembled, and the gearing can be very readily applied to and removed from the engine shaft or other driving shaft.

The structure has great rigidity owing to the provision of the centralizing brake mechanism F, the large bearing surfaces which are furnished, and the substantial lodgment of the propeller shaft in the end portion of the engine shaft structure. The lever arrangement for operating mechanism is very simple and compact. There are no lever attachments extending up over the reverse gear or extending down into the bilgewater. The revolving lever parts of the clutch mechanisms are all covered, whereby the safety factor is increased, and all adjustments of the clutch mechanism are in the same location and easily accessible. The adjustment of the two sets of levers 58, 68 is independent, and the action of centrifugal force on these levers tends to aid them in their proper function.

Various changes in the details of the mechanism may be made without departing from the scope of the invention, as defined in the claims. For example, the particular manner of connecting the driving part to the driving internal gear can be considerably varied, as required by conditions, and the method of connecting the driven internal gear with the driven member may also be considerably varied, a greater or less number of parts being employed, as called for by conditions. Furthermore, the method employed for making the housing rotate with the carrier is susceptible of variation, and in fact the pinion cage can be controlled, i. e., locked and released, without the interposition of a special housing. It will also be understood that while the multiple tooth pinion contact is of importance in some phases of the invention, it is unessential in others, and that in some cases a different arrangement of the pinions may be employed. While a cone type clutch is shown at the forward end of the reversing gear and a disc clutch at the rear end, it will be understood that the invention is not limited thereto, but that either type of clutch may be used in these positions. Many changes in these and other respects can be made without digressing from the broad principles of the invention.

What I claim is:

1. In a mechanism of the character described, an internal driving gear, an internal driven gear and pinions meshing with each other and meshing respectively with said gears, means supporting said pinions for rotative and bodily movement, a casing embracing said gears and connected to said supporting means, and means for connecting all of said members to rotate together.

2. In mechanism of the character described, driving and driven members independently rotatable concentric ring-like gears each having teeth on its inner periphery, means for attaching said gears to said driving and driven members respectively, and intermeshing pinions for transmitting reverse rotation from the driving gear to the driven gear, engaging the teeth of the respective gears, said pinions having bearings rotatable about the axis of said gears, means for supporting said pinions and means for locking and releasing said support including a casing embracing said gears and non-rotatively connected to said pinion support.

3. In mechanism of the character described, driving and driven members independently rotatable concentric ringlike gears each having teeth on its inner periphery, means for attaching said gears to said driving and driven members respectively, and intermeshing pinions for transmitting reverse rotation from the driving gear to the driven gear, engaging the teeth of the respective gears, said pinions having bearings rotatable about the axis of said gears, and means for holding said pinion bearings stationary including a housing embracing the gears and adapted to be clutched to one thereof.

4. In mechanism of the character described, an internal gear member, a second internal gear member, a third member comprising a pinion carrier, intermeshing pinions thereon in constant engagement with said gears, and means for holding one of said members stationary including a housing embracing the gears and non-rotatively connected to the pinion carrier.

5. In reverse gearing, a driving member, an internal driving gear secured to the same, a driven member, an internal driven gear secured to said driven member, a pinion carrier, a set of intermeshing pinions thereon for transmitting rotation from the driving gear to the driven gear, in constant engagement with said gears, said pinion carrier being adapted to rotate bodily, and means for holding it against rotation including a housing embracing the internal gears and connected to the pinion carrier.

6. In reverse gearing, internal driving and driven gears, transmitting pinions cooperating therewith, a carrier mounting said pinions, a housing non-rotatably associated with said carrier, and means for locking and releasing the housing.

7. In reverse gearing, driving and driven internal gears, gear mechanism cooperating therewith including a rotary carrier member having pinions mounted thereon meshing with said gears, a housing embracing the gears fixed relatively to said carrier member, and means cooperating with the housing for holding said carrier member against rotation.

8. In reverse gearing, driving and driven internal gears, transmitting mechanism cooperating therewith, a rotary housing having a fixed relation to said transmitting mechanism, and means for locking and releasing said housing.

9. In reverse gearing, driving and driven internal gears, transmitting mechanism interposed between said gears, having a rotary housing, and a brake associated with the housing to lock the same against movement.

10. In reverse gearing, driving and driven internal gears, power transmitting mechanism interposed between said gears, having a rotary housing enclosing said gears, and means for locking said housing against rotation.

11. In reverse gearing, driving and driven internal gears, power transmitting mechanism interposed therebetween including a rotary casing member, and a cone brake associated with said casing member for holding the same against rotation.

12. In reverse gearing, driving and driven internal gears, power transmitting mechanism interposed therebetween including a rotary casing member enclosing said gears, and means for locking said casing member against rotation, comprising a brake structure embracing a portion of said casing member.

13. In reverse gearing, driving and driven internal gears, a rotary casing member enclosing said gears, pinions movable with said casing member and engaging said gears for transmitting rotation from the driving to the driven gear, and means for holding said casing member stationary.

14. In reverse gearing, driving and driven members, internal gears secured to the respective members, a rotary housing, pinions rotatably mounted within the housing and adapted to revolve bodily therewith for transmitting reverse rotation from the driving to the driven gear, and means for holding the housing stationary.

15. In reverse gearing, a driving shaft, a driven shaft, a driving internal gear on the driving shaft, a driven internal gear on the driven shaft, a rotary housing enclosing said gears, pinion bearings within the housing adapted to be turned with said housing bodily about the axis of said gears, means for holding the housing against rotation for securing reverse drive, and means for interlocking the housing with the driving and driven members for obtaining direct drive.

16. In mechanism of the character described, driving and driven internal gears, transmitting gearing interposed therebetween for rotating the driven gear from the driving gear in a reverse direction, said transmitting gear having a carrier mounted for rotation, means for locking the carrier against rotation to obtain reverse drive, and means for fixing said gears relatively to each other to obtain forward, direct drive.

17. In reverse gearing, a driving member, a driven member, internal gears secured to the respective members, transmitting gearing interposed between said gears and having a rotary housing, means for holding the housing stationary to obtain reverse drive, and means for coupling the housing to the driving and driven members respectively for obtaining forward, direct drive.

18. In mechanism of the character described, a driving member, a driven member, internal gears secured to the respective members, a rotary housing, transmitting gear members within said housing having bearings fixed with relation to said housing so as to move bodily therewith, means for locking the housing against rotation, and means for coupling the housing to the driving and driven members respectively.

19. In mechanism of the character described, driving and driven members, internal gears secured to said members, a rotary housing, a set of gear members rotatable with the housing, means for locking the housing against rotation to obtain reverse drive, means for coupling the housing with the driving member, and means for coupling the housing with the driven member.

20. In mechanism of the character described, driving and driven members, internal gears secured to the respective members, a rotary housing, a set of pinions rotatable with the housing and adapted to transmit reverse rotation from the driving gear to the driven gear, a brake for holding the housing against rotation, a clutch for interlocking the driving member with one end of the housing, and a second clutch for interlocking the driven member with the other end of the housing.

21. In mechanism of the character described, driving and driven internal gears, a rotary set of pinions interposed therebetween, driving and driven members carrying the respective gears, a housing fixed with relation to said set of pinions but mounted for rotation, means for holding said housing stationary so as to obtain reverse drive, and means for coupling the driving and driven members to the housing.

22. In mechanism of the character described, driving and driven annular gears each having internal spur teeth, a plurality of long spur pinions meshing with the teeth of one of said gears, a plurality of short pinions meshing with the teeth of the other gear, each of said long pinions meshing with the teeth of at least two of said short pinions, means for mounting said pinions, and means to connect said parts for rotation as a unit.

23. In mechanism of the character described, driving and driven gears, at least one of said gears being an annular gear with internal spur teeth, a plurality of spur pinions meshing with the teeth of said last-named gear, a plurality of spur pinions meshing with the other gear, at least one pinion of one group being arranged to mesh with and drive directly a plurality of pinions of the other group, and means for supporting said pinions for rotative movement and holding them against bodily movement whereby reverse rotation is imparted to the driven gears through multiple tooth contact from pinion to pinion.

24. In mechanism of the character described, driving and driven gears, intermediate pinions, a rotary pinion carrier, a rotary enclosing casing or drum engaged therewith, an external centralizing brake for locking the casing or drum against rotation, comprising a stationary outer cone member, and an inner cooperating cone member carried by said casing or drum, and means for operating said brake.

25. In mechanism of the character described, driving and driven gears, a rotary set of interposed pinions cooperating therewith, bearing members for said pinions, a housing in which said bearing members are located, said housing having means providing for the lubrication of said pinion bearings by lubricant introduced from the exterior of the housing through the axes or centers of said bearings.

26. In mechanism of the character described, driving and driven gears, a rotary set of suitably supported interposed pinions cooperating therewith, bearing members for said pinions, a housing enclosing said gears, bearing members and pinions, and means whereby lubricant is supplied to a plurality of said pinion bearings from the exterior of the housing through their axes or centers.

27. In mechanism of the character described, driving and driven gears, pinions interposed between the same, a plurality of studs on which said pinions are mounted, a carrier supporting said studs, a housing enclosing said pinions, and means whereby lubricant is supplied to the bearing surfaces of a plurality of studs from the exterior of the housing by way of interior passages in said studs.

28. In mechanism of the character described, driving and driven gears, a plurality of interposed pinions, studs on which said pinions have bearings, a housing enclosing said pinions, a plurality of said pinion studs being hollowed out to provide interior lubricant reservoirs, and means whereby lubricant is supplied to said reservoirs from the exterior of the housing by way of a series of ducts and passages.

29. In mechanism of the character described, a pinion carrier, a plurality of pinion studs mounted therein, pinions rotatable on said studs, said studs having interior lubricant reservoirs, and means associated with said bearings for connecting the reservoir of one stud with that of an adjacent stud.

30. In mechanism of the character described, a pinion carrier, a plurality of pinion studs mounted therein, pinions rotatable on said studs, said studs having interior lubricant reservoirs, and means for connecting the reservoir of one stud with that of an adjacent stud, said studs having one or more ducts leading outwardly from the lubricant reservoir to the pinion bearings.

31. In mechanism of the character described, a rotary carrier member, a plurality of studs mounted therein having exterior bearing surfaces, gearing members mounted on said studs in contact with said bearing surfaces, one of said studs having an interior lubricant reservoir in communication with the corresponding bearing surface, and also in communication with the bearing surface of another stud.

32. In mechanism of the character described, a rotary carrier member, studs mounted on said carrier member, a housing enclosing the carrier member, gears within said housing, pinions to cooperate with said gears rotatable on said studs, at least one of said studs having an interior lubricant reservoir in communication with the bearing surface on which the corresponding pinion rotates, and also in communication with the bearing surface of another stud, and means providing for the introduction of lubricant into said reservoir from the exterior of said housing.

33. Gear mechanism, comprising an internal gear member, a second internal gear member, a third member comprising a pinion carrier and pinions carried thereby in constant engagement with said gear members, a housing enclosing said members non-rotatably associated with one of said members and means for holding said housing against rotation.

34. In a device of the character described, a driven shaft, an internal gear non-rotatably mounted thereon, a driving shaft, gears actuated by said driving shaft and certain of said gears being in mesh with said internal gear, a gear housing, means for coupling said housing to the driving shaft and to the internal gear, said actuated gears including a driven internal gear.

35. A device of the character described, comprising a driving and a driven shaft, and means for transmitting power from one to the other thereof, including an internal gear member, a second internal gear member, a third member comprising a pinion carrier and pinions thereon in constant engagement with said gears, a housing non-rotatably secured to one of said members, and means for holding said housing stationary.

36. In a mechanism of the character described, driving and driven shafts having internal gears non-rotatively secured thereto, a floating pinion carrier having pinions thereon engaged respectively with said gears, and clutches at opposite sides of said pinion carrier for clutching it non-rotatively to said shafts, and means for actuating one of said clutches and thereby actuating the other clutch through said pinion carrier.

37. In a mechanism of the character described, driving and driven shafts having internal gears non-rotatably secured thereto, a floating pinion carrier having pinions engaged respectively with said gears, a housing enclosing said gears and non-rotatively engaged with said carrier, a clutch for engaging said driving shaft to the housing, and a separate clutch for engaging the driven shaft to the housing, said first mentioned clutch being formed on the outer periphery of the internal driving gear, and means including said floating carrier for actuating both said clutches.

In witness whereof, I have hereunto set my hand on the 18th day of June, 1919.

ARTHUR T. NABSTEDT.